United States Patent
Gill

(10) Patent No.: US 7,180,714 B2
(45) Date of Patent: Feb. 20, 2007

(54) APPARATUS FOR PROVIDING A BALLISTIC MAGNETORESISTIVE SENSOR IN A CURRENT PERPENDICULAR-TO-PLANE MODE

(75) Inventor: Hardayal Singh Gill, Palo Alto, CA (US)

(73) Assignee: Hitachi Global Storage Technolgies Netherlands B.V., Amsterdam (NL)

( * ) Notice: Subject to any disclaimer, the term of this patent is extended or adjusted under 35 U.S.C. 154(b) by 408 days.

(21) Appl. No.: 10/674,725

(22) Filed: Sep. 30, 2003

(65) Prior Publication Data

US 2005/0068685 A1  Mar. 31, 2005

(51) Int. Cl.
G11B 5/39 (2006.01)

(52) U.S. Cl. ............... 360/324.1; 360/324.12

(58) Field of Classification Search ............ None
See application file for complete search history.

(56) References Cited

U.S. PATENT DOCUMENTS

| | | | |
|---|---|---|---|
| 5,206,590 | A | 4/1993 | Dieny et al. |
| 5,422,621 | A | 6/1995 | Gambino et al. |
| 5,432,373 | A | 7/1995 | Johnson |
| 5,695,864 | A | 12/1997 | Slonczewski |
| 5,835,003 | A | 11/1998 | Nickel et al. |
| 5,936,402 | A | 8/1999 | Schep et al. |
| 6,232,777 | B1 | 5/2001 | Sato et al. |

2004/0201929 A1* 10/2004 Hashimoto et al. ...... 360/324.1

FOREIGN PATENT DOCUMENTS

| | | |
|---|---|---|
| JP | 08-088422 | 4/1996 |
| JP | 2001189504 | 7/2001 |
| WO | WO 95/26547 | 10/1995 |
| WO | WO 02095434 | 11/2002 |

OTHER PUBLICATIONS

Zhao, Y.-W., Munoz, M. Tatara, G. and Garcia, N., "From Ballistic to Non-Ballistic Magnetoresistance in Nonocontacts: Theory and Experiments," *Journal of Magnetism and Magnetic Materials*, 223 (2001) 169-174.

N. Garcia, M. Munoz, V.V. Osipov, E.V. Ponizovskaya, G.G. Qian, I.G. Savellev, and .Y. -W. Zhao, "Ballistic Magnetoresistance in Different Nanocontact Configurations: A Basis for Future Magnetoresistance Sensors," *Journal of Magnetism and Magnetic Materials*, 240 (2002) 92-99.

Hartmann, Uwe, "Magnetic Multilayers and Giant Magnetoresistance," *Springer Series in Surface Sciences*, pp. 163-168. (2002).

(Continued)

*Primary Examiner*—A. J. Heinz
(74) *Attorney, Agent, or Firm*—Daviid W. Lynch; Chambliss, Bahner & Stophel P.C.

(57) ABSTRACT

A method and apparatus for providing a ballistic magnetoresistive sensor in a current perpendicular-to-plane mode is disclosed. A nickel nano-contact is provided in a current perpendicular-to-plane sensor. The nano-contact switches its magnetization with the switching of the free layer to provide an increase in resistance that is used to detect magnetically recorded data.

20 Claims, 6 Drawing Sheets

OTHER PUBLICATIONS

Harsh Deep Chopra and Susan Z. Hua "Ballistic Magnetoresistance over 3000% in Ni Nanocontacts at Room Temperature," *Physical Review B*. 66, 020403(R) (2002).

M. Munoz, G.G. Qian, N. Karar, H. Cheng, I.G. Saveliev, N. Garica, T.P. Moffat, P.J. Chen, L. Gan, and W.F. Egelhoff, Jr. "Ballistic Magnetoresistance in a Nanocontact Between a Ni Cluster and a Magnetic Thin Film," *Applied Physics Letter*, vol. 79, No. 18, Oct. 29, 2001.

A. Encinas, F. Nguyen Van Dau, M. Sussiau, A. Schuhl, and P. Galtler, "Contribution of Current Perpendicular to the Plane to the Giant Magnetoresistance of Laterally Modulated Spin Values," Applied Physics Letters, vol. 71, No. 22, Dec. 1, 1997.

Edward Price, "Magnetoresistance in Ballistic Transport Devices," *CMRR & UCSD Physics*, May 22, 2002.

* cited by examiner

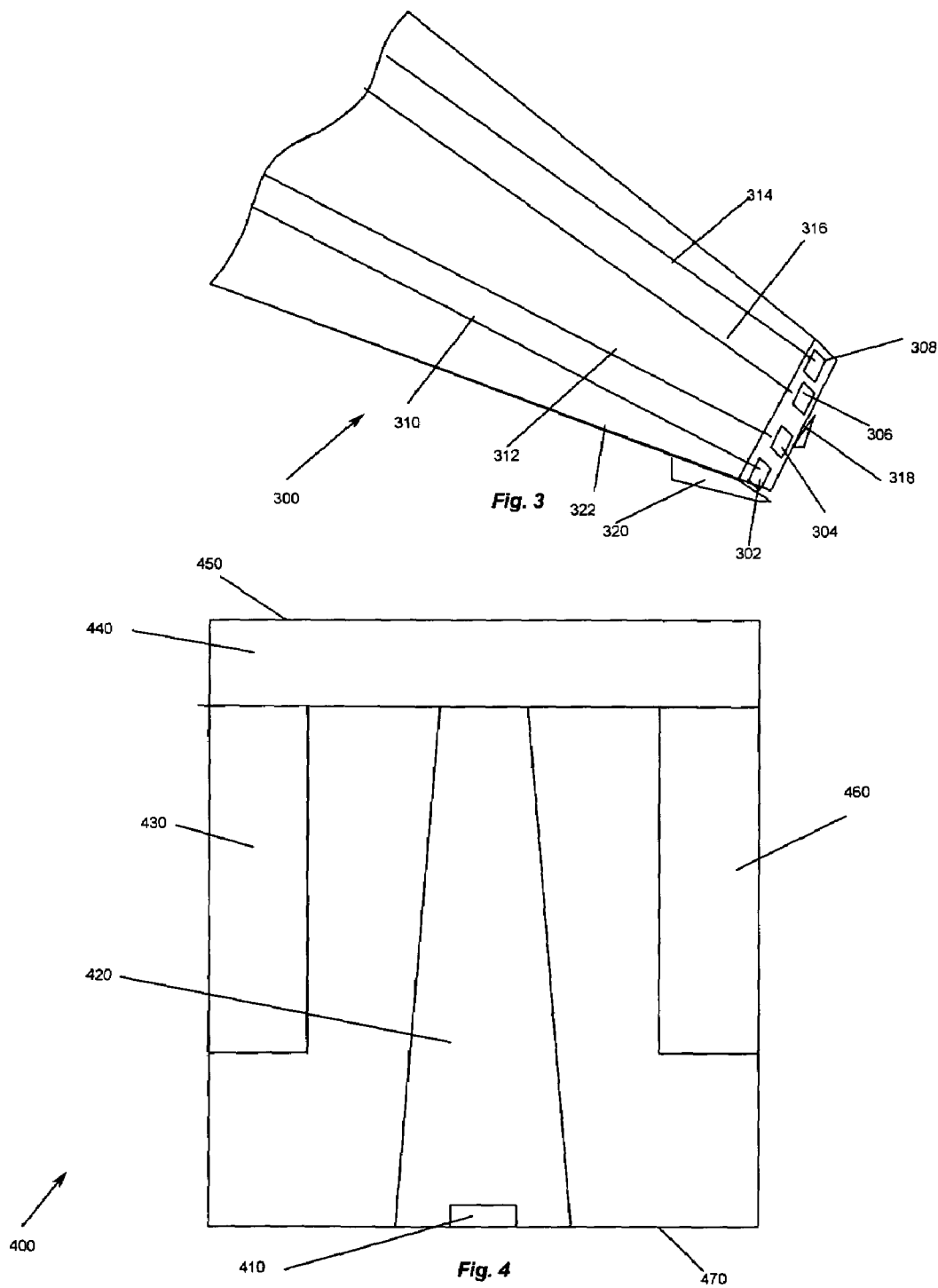

APPARATUS FOR PROVIDING A BALLISTIC MAGNETORESISTIVE SENSOR IN A CURRENT PERPENDICULAR-TO-PLANE MODE

BACKGROUND OF THE INVENTION

1. Field of the Invention

This invention relates in general to a magnetic read sensors, and more particularly to a method and apparatus for providing a ballistic magnetoresistive sensor in a current perpendicular-to-plane mode.

2. Description of Related Art

Computer systems generally utilize auxiliary memory storage devices having media on which data can be written and from which data can be read for later use. A direct access storage device, such as a disk drive, incorporating rotating magnetic disks is commonly used for storing data in magnetic form on the disk surfaces. Data is recorded on concentric, radially spaced tracks on the disk surfaces. Magnetic heads carrying read sensors are then used to read data from the tracks on the disk surfaces.

An MR sensor detects a magnetic field through a change in resistance in its MR sensing layer (also referred to as an "MR element") as a function of the strength and direction of the magnetic flux being sensed by the MR layer. The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin dependent scattering, which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect. In an SV sensor, one of the ferromagnetic layers, referred to as the pinned layer, has its magnetization typically pinned by exchange coupling with an antiferromagnetic (e.g., NiO or Fe—Mn) layer. The magnetization of the other ferromagnetic layer, referred to as the free layer, however, is not fixed and is free to rotate in response to the field from the recorded magnetic medium (the signal field). In SV sensors, the SV effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the SV sensor and a corresponding change in the sensed current or voltage. It should be noted that the AMR effect is also present in the SV sensor free layer and it tends to reduce the overall GMR effect.

The magnetic moment of the free layer when the sensor is in its quiescent state is preferably perpendicular to the magnetic moment of the pinned layer and parallel to the ABS. This allows for read signal asymmetry upon the occurrence of positive and negative magnetic field incursions of a rotating disk.

Electrical leads and/or shields are positioned to make electrical contact with the ferromagnetic layers. In a CIP (Current-In-Plane) spin valve sensor, the leads are arranged so that electrical current passes through the sensor in a direction that is parallel to the plane of the pinned and free layers. In a CPP (Current Perpendicular To Plane) sensor, the leads are arranged to induce a sense current that passes perpendicularly through the spacer layer from the pinned ferromagnetic layer to the free layer. In either case, when the sense current passes through the sensor, a readback signal is generated which is a function of the resistance changes that result when the magnetic moment of the free layer rotates relative to the pinned layer magnetic moment under the influence of recorded magnetic domains. Resistance is lower when the relative magnetic moments are parallel and higher when the magnetic moments are antiparallel. While CIP (Current-In-Plane) spin valve sensor are a natural configuration for magnetoresistance MR measurements, a CPP (Current Perpendicular To Plane) sensors have proven to pose a difficult technical problem due to lower resistances. Another way in which spin orientation may be used to detect encoded information on a storage medium such as a hard drive is using Ballistic magnetoresistance (BMR). In ballistic magnetoresistance, the sensor size is reduced to just a cluster of ferromagnetic atoms, joined together by two leads. The term "Ballistic" means that the sensor is smaller than the typical scattering path length for the electron. This means that the scattering the electron suffers will be owing to magnetic effects and not to general scattering from atoms in the sensor itself, thereby making the readout process very sensitive. If the electrons flowing in the circuit have been spin-polarized, then when the electrons flow through the sensor, the electrons will scatter more or less to provide greater or lesser resistance, depending on the magnetization state within the atom layer constituting the contact, and on the faint force exerted by the tiny magnetic storage domain being read out by the sensor. However, to develop a BMR sensor, a stable nano-contact region must be provided with the proper conductive and magnetic properties. Further, it would be advantageous to provide a CPP-BMR so that the performance improvements of CPP sensors may be utilized. A CPP-BMR sensor also would also provide further advantages as the sensor is scaled to higher and higher densities (i.e., smaller sensor size) because the signal is inversely proportional to its cross-sectional area.

It can be seen that there is a need for a method and apparatus for providing a ballistic magnetoresistive sensor in a current perpendicular-to-plane mode.

SUMMARY OF THE INVENTION

To overcome the limitations in the prior art described above, and to overcome other limitations that will become apparent upon reading and understanding the present specification, the present invention discloses a method and apparatus for providing a ballistic magnetoresistive sensor in a current perpendicular-to-plane mode.

The present invention solves the above-described problems by providing a nickel nano-contact in a current perpendicular-to-plane sensor. The nano-contact switches its magnetization with the switching of the free layer to provide an increase in resistance that is used to detect magnetically recorded data.

A ballistic magnetoresistive sensor in accordance with the principles of the present invention includes a first pinned layer, a first free layer, a nickel nano-contact layer disposed between the pinned layer and the free layer and a first and second lead layer disposed proximate to the pinned layer and free layer respectively for providing a sense current that flows perpendicular to the planes of the layers.

In another embodiment of the present invention, a magnetic storage device is provided. The magnetic storage device includes at least one magnetic storage medium, a motor for moving the at least one magnetic storage medium, a ballistic magnetoresistive sensor for reading data on the at least one magnetic storage medium and an actuator assembly, coupled to the ballistic magnetoresistive sensor, for moving the ballistic magnetoresistive sensor relative to the at least one magnetic storage medium, the ballistic magnetoresistive sensor further including a first pinned layer, a first free layer, a nickel nano-contact layer disposed between the pinned layer and the free layer and a first and second lead layer disposed proximate to the pinned layer and free layer respectively for providing a sense current that flows perpendicular to the planes of the layers.

In another embodiment of the present invention, a method for forming a ballistic magnetoresistive sensor is provided. The method for forming a ballistic magnetoresistive sensor includes forming a first free layer, a nickel nano-contact layer disposed between the pinned layer and the free layer, forming a first pinned layer and forming a first and second lead layer disposed proximate to the pinned layer and free layer respectively for providing a sense current that flows perpendicular to the planes of the layers.

In another embodiment of the present invention, another ballistic magnetoresistive sensor is provided. This ballistic magnetoresistive sensor includes means for providing a pinned layer, means for providing a free layer, means for providing a nickel nano-contact layer disposed between the means for providing a pinned layer and the means for providing a free layer and means for providing a first and second lead layer disposed proximate to the means for providing the pinned layer and free layer respectively, the means for providing a first and second lead layer providing a sense current that flows perpendicular to the planes of the layers.

In another embodiment of the present invention, another magnetic storage device is provided. This magnetic storage device includes means for recording magnetic data thereon, means for moving the means for recording magnetic data, means for reading data on the means for recording magnetic data and means, coupled to the means for reading, for moving the means for reading relative to the means for storing data, the means for reading further including means for providing a pinned layer, means for providing a free layer, means for providing a nickel nano-contact layer disposed between the means for providing a pinned layer and the means for providing a free layer and means for providing a first and second lead layer disposed proximate to the means for providing the pinned layer and free layer respectively, the means for providing a first and second lead layer providing a sense current that flows perpendicular to the planes of the layers.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a ballistic magnetoresistive sensor in a current perpendicular-to-plane mode. A nickel nano-contact is provided in a current perpendicular-to-plane sensor. The nano-contact switches its magnetization with the switching of the free layer to provide an increase in resistance that is used to detect magnetically recorded data.

Figure 1:
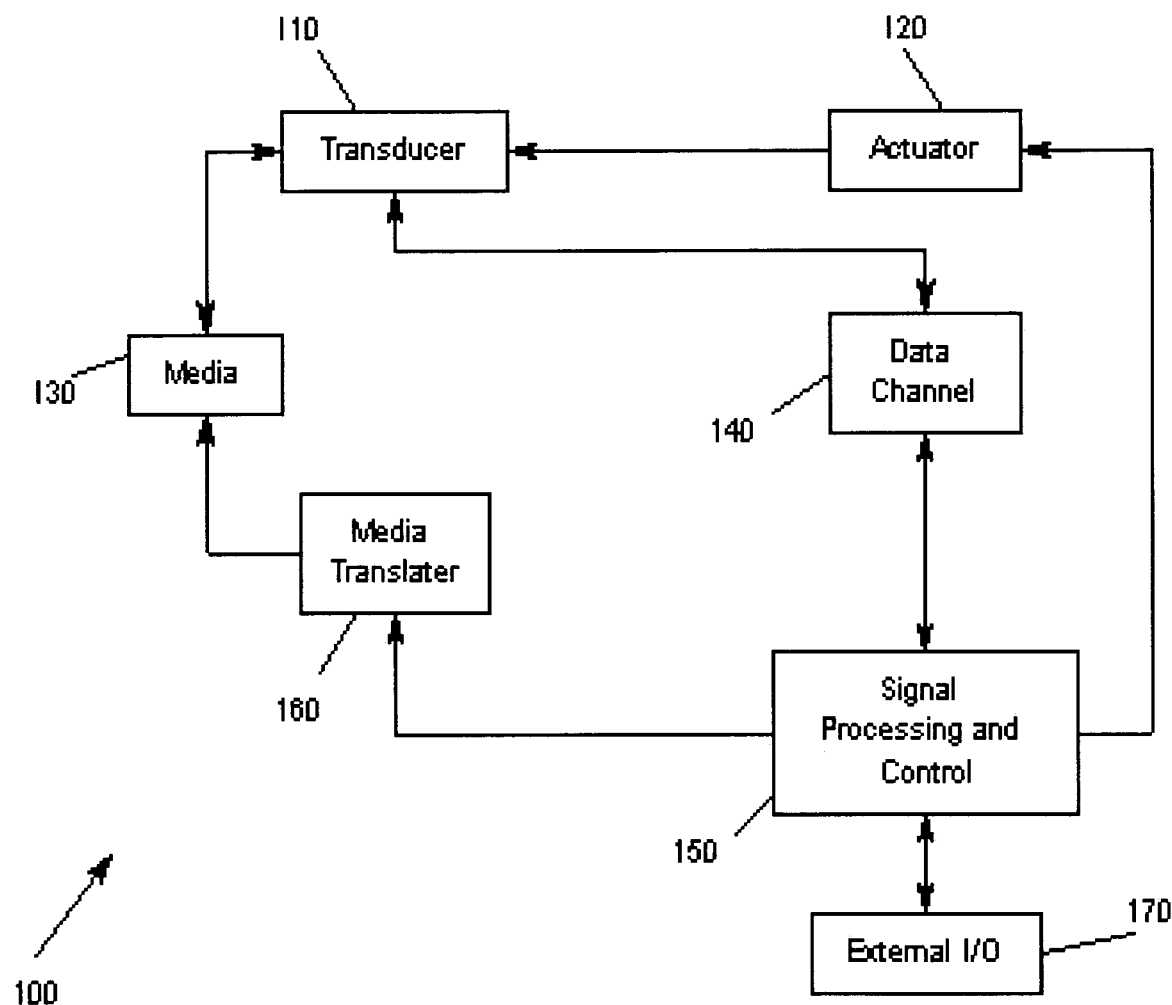
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
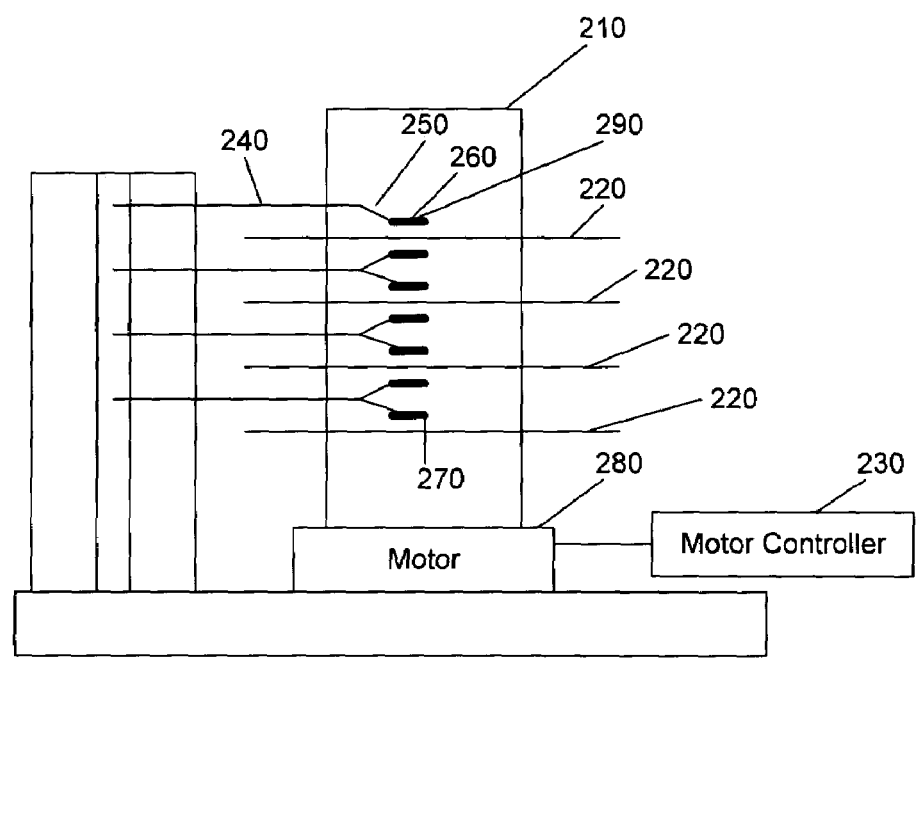
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 is a diagram 300 that illustrates a slider 320 mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
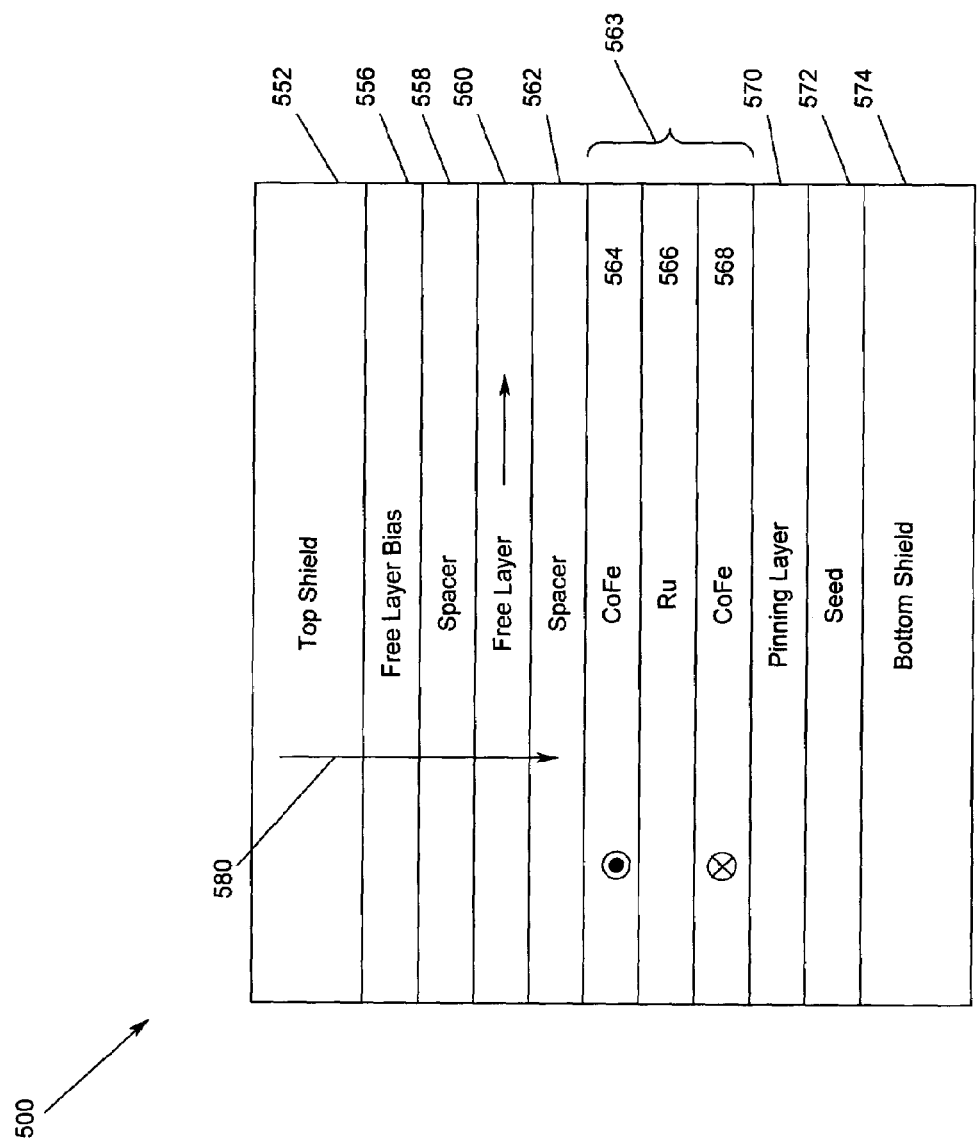
FIG. 5 shows an ABS view of a CPP type of spin valve wherein the current flow is perpendicular to the plane of the free layer.

FIG. 5 shows an ABS view 500 of a CPP type of spin valve, wherein the current flow is perpendicular to the plane of the free layer. Spin valve head 500 includes top shield 552, bias layer 556, spacer layer 558, free layer 560, second spacer layer 562, pinned layer 563, pinning layer 570, seed layer 572 and bottom shield 574. Top shield 552 also acts as a shared pole in merged read/write heads. Bias layer 556 is an antiferromagnetic material, such as IrMn, PtMn, NiMn, etc. Spacer layers 558 and 562 may be formed of Cu, Au, Ag, NiFeCr, Al, Ru, etc. Free layer 560 is a ferromagnetic layer, such as NiFe. The magnetization of free layer 560 is shown by an arrow on that layer. Pinned layer 563 is a synthetic antiferromagnet or SAF, and includes, for example, first CoFe layer 564, Ru spacer layer 566 and second CoFe layer 568.

When two ferromagnetic layers, such as CoFe layers 564 and 568 are separated by a spacer of an appropriate thickness, the two ferromagnetic layers couple strongly with magnetic moments anti-parallel as shown by the circled "X" (into the paper) and circled dot (out of the paper) on these layers. The use of a synthetic antiferromagnet for pinned layer 563 provides a reduced demagnetization field, and provides better magnetic stability. Alternatively, pinned layer 563 could be a single soft magnetic layer, such as CoFe. Pinning layer 570 is an antiferromagnetic material, such as IrMn, PtMn, NiMn, etc.

Top shield 552 and bottom shield 574 act as electrodes for conducting a sense current. The sense current flows between top shield 552 and bottom shield 574 and through layers 556–572. This mode of operation, where the sense current 580 flows perpendicular to the plane of spacer layer 562, is referred to as current perpendicular-to-plane or CPP mode. Operation in CPP mode provides an enhanced GMR response.

While CPP GMR heads as shown in FIG. 5 provide an enhanced GMR response compared to current-in-plane (CIP) GMR heads (which would have leads at the sides of at least some of layers 556–572 so that the current would flow between the side leads parallel to the layers 556–572), lately ballistic magnetoresistive (BMR) heads have been the subject of investigation within microelectronics research. The focus on BMR heads is based on experimental results that indicate that the BMR effect results in increased sensitivity and therefore may possibly lead to smaller read heads.

Figure 6:
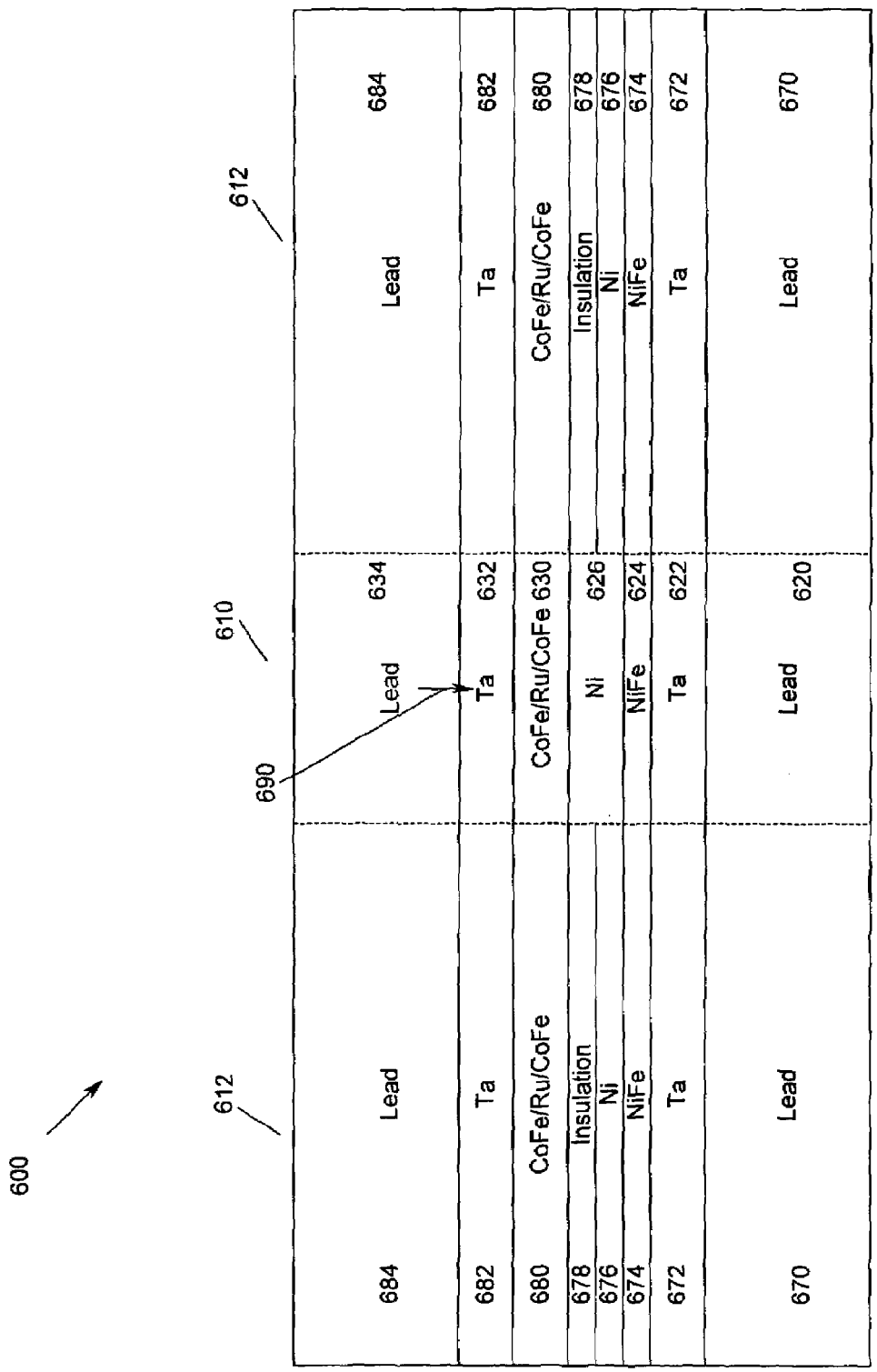
FIG. 6 illustrates a BMR head structure according to an embodiment of the present invention.

FIG. 6 illustrates a BMR head structure 600 according to an embodiment of the present invention. In FIG. 6, the BMR sensor 600 includes a nano-contact region 610 that electrons traverse and a region outside 612 the nano-contact region. The nano-contact region 610 includes a first lead layer 620, a first tantalum layer 622, a NiFe free layer 624, a first layer of nickel 626, a CoFe/Ru/CoFe pinned layer 630, a second tantalum layer 632 and a second lead layer 634. The regions outside 612 the nano-contact region includes a first lead layer 670, a first tantalum layer 672, a NiFe layer free 674, an insulation layer 676, a layer of nickel 678, a CoFe/Ru/CoFe pinned layer 680, a second tantalum layer 682 and a second lead layer 684.

In FIG. 6, electrons pass through the nickel nano-contact 626 that bridges the two lead layers 620, 634. The nickel nano-contact 626 is disposed between a NiFe free layer 624 and a pinned layer 630. When the magnetic orientation of the electrons, also known as their spin, is the same as the magnetic orientation of the nickel nano-contact 626, the electrons travel effortlessly through the nickel nano-contact 626. This phenomenon is known as ballistic magnetoresistance (BMR).

Recorded data can be read from a magnetic medium because the external magnetic field from the recorded magnetic medium, or signal field, causes a change in the direction of magnetization of the NiFe free layer 624. The magnetization of the nickel nano-contact 626 switches with the NiFe free layer 624 to provide the BMR signal. The magnetization of the pinned layer 630 stays pinned. The switching of the magnetization of the nickel nano-contact 626 causes a change in the resistance of the BMR sensor 600 and a corresponding change in the sensed current or voltage.

For example, the resistance changes from low to high as the magnetization of the nickel nano-contact 626 becomes antiparallel to the magnetization of the pinned layer 630. It is this larger BMR effect that provides the opportunity for smaller and more sensitive read heads capable of reading smaller magnetic bits. And that, in turn, could boost the storage density of storage devices. As can be seen in FIG. 6, the current 690 flows perpendicular to the plane of the layers.

Figure 7:
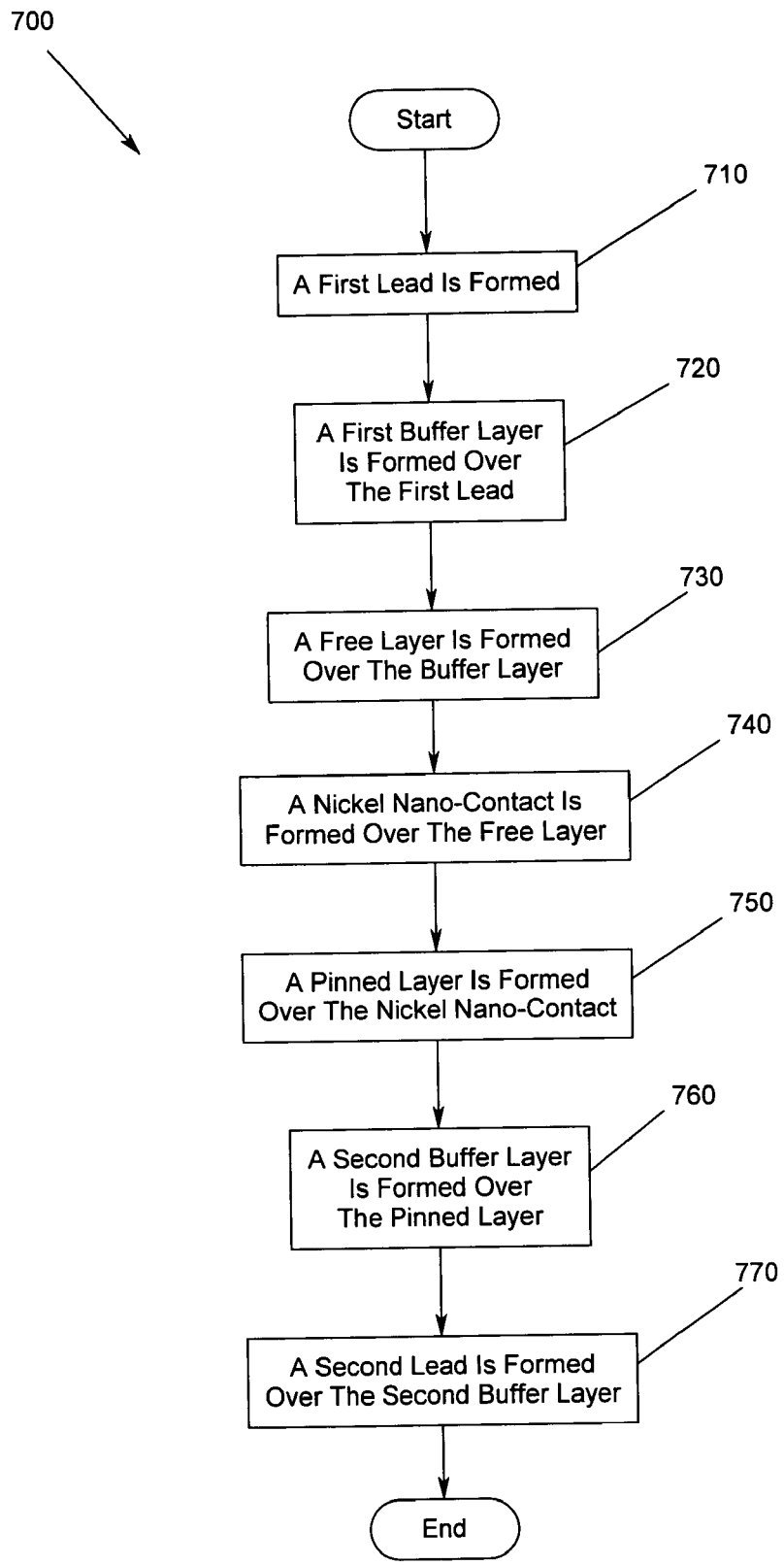
FIG. 7 illustrates a flow chart of the method for forming a ballistic magnetoresistive sensor in a current perpendicular-to-plane mode according to an embodiment of the present invention.

FIG. 7 illustrates a flow chart 700 of the method for forming a ballistic magnetoresistive sensor in a current perpendicular-to-plane mode according to an embodiment of the present invention. In FIG. 7, a first lead is formed 710. A buffer layer is formed over the first lead 720. For example, the buffer layer may be tantalum. A free layer is formed over the buffer layer 730. A nickel nano-contact is formed over the free layer 740. A pinned layer is formed over the nickel nano-contact 750. A second buffer layer is formed over the pinned layer 760. A second lead is formed over the second buffer layer 770.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A ballistic magnetoresistive sensor, comprising:
    a first pinned layer;
    a first free layer;
    a magnetic nickel nano-contact layer disposed between the pinned layer and the free layer, the magnetic nickel nano-contact layer having a width equal to a width of the first pinned layer and the first free layer; and
    a first and second lead layer disposed proximate to the pinned layer and free layer respectively for providing a sense current that flows perpendicular to the planes of the layers.

2. The ballistic magnetoresistive sensor of claim 1 further comprising layers of tantalum disposed between the pinned layer and between the first lead and the free layer and the second lead.

3. The ballistic magnetoresistive sensor of claim 1, wherein the first pinned layer, first free layer, nickel nano-contact layer and first and second lead layers form a nano-contact region.

4. The ballistic magnetoresistive sensor of claim 1, wherein the first pinned layer, the first free layer, the nickel nano-contact layer and the first and second lead layer are formed in a nano-contact region, the ballistic magnetoresistive sensor further comprising, disposed in outside regions on opposite sides of the layers of the nano-contact region, a third lead layer and a fourth lead layer formed on opposite sides of the first lead layer, a second pinned layer and a third pinned layer formed on opposite sides of the first pinned layer, a second free layer and a third free layer formed on opposite sides of the first free layer, a first insulation layer formed between the second pinned layer and the second free layer, a second insulation layer formed between the third pinned layer and the third free layer, the first insulation layer and the second insulation layer formed on opposite sides of the nickel nano-contact layer and a fifth lead layer and a sixth lead layer formed on opposite sides of the second lead layer.

5. The ballistic magnetoresistive sensor of claim 4, wherein the pinned layers comprise a layer of nickel and a layer of cobalt iron (CoFe).

6. The ballistic magnetoresistive sensor of claim 4, wherein the free layers comprise a layer of nickel iron (NiFe).

7. The ballistic magnetoresistive sensor of claim 4 further comprising layers of tantalum disposed between the second pinned layer and the third lead layer, between the third pinned layer and the fourth lead layer, between the second free layer and the fifth lead layer, and between the third free layer and the sixth lead layer.

8. The ballistic magnetoresistive sensor of claim 1, wherein the pinned layer comprises a layer of nickel and a layer of cobalt iron (CoFe).

9. The ballistic magnetoresistive sensor of claim 1, wherein the free layer comprises a layer of nickel iron (NiFe).

10. A magnetic storage device, comprising:
    at least one magnetic storage medium;
    a motor for moving the at least one magnetic storage medium;
    a ballistic magnetoresistive sensor for reading data on the at least one magnetic storage medium, and
    an actuator assembly, coupled to the ballistic magnetoresistive sensor, for moving the ballistic magnetoresistive sensor relative to the at least one magnetic storage medium, the ballistic magnetoresistive sensor further comprising:
    a first pinned layer;
    a first free layer;
    a magnetic nickel nano-contact layer disposed between the pinned layer and the free layer, the magnetic nickel nano-contact layer having a width equal to a width of the first pinned layer and the first free layer; and
    a first and second lead layer disposed proximate to the pinned layer and free layer respectively for providing a sense current that flows perpendicular to the planes of the layers.

11. The magnetic storage device of claim 10 further comprising layers of tantalum disposed between the pinned layer and the first lead and between the free layer and the second lead.

12. The magnetic storage device of claim 10, wherein the first pinned layer, first free layer, nickel nano-contact layer and first and second lead layers form a nano-contact region.

13. The magnetic storage device of claim 10, wherein the first pinned layer, the first free layer, the nickel nano-contact layer and the first and second lead layer are formed in a nano-contact region, the ballistic magnetoresistive sensor further comprising, disposed in outside regions on opposite sides of the layers of the nano-contact region, a third lead layer and a fourth lead layer formed on opposite sides of the first lead layer, a second pinned layer and a third pinned layer formed on opposite sides of the first pinned layer, a second free layer and a third free layer formed on opposite sides of the first free layer, a first insulation layer formed between the second pinned layer and the second free layer, a second insulation layer formed between the third pinned layer and the third free layer, the first insulation layer and the second insulation layer formed on opposite sides of the nickel nano-contact layer and a fifth lead layer and a sixth lead layer formed on opposite sides of the second lead layer.

14. The magnetic storage device of claim 13, wherein the pinned layers comprise a layer of nickel and a layer of cobalt iron (CoFe).

15. The magnetic storage device of claim 13, wherein the free layers comprise a layer of nickel iron (NiFe).

16. The magnetic storage device of claim 13 further comprising layers of tantalum disposed between the second pinned layer and the third lead layer, between the third pinned layer and the fourth lead layer, between the second free layer and the fifth lead layer, and between the third free layer and the sixth lead layer.

17. The magnetic storage device of claim 10, wherein the pinned layer comprises a layer of nickel and a layer of cobalt iron (CoFe).

18. The magnetic storage device of claim 10, wherein the free layer comprises a layer of nickel iron (NiFe).

19. A ballistic magnetoresistive sensor, comprising:
    means for providing a pinned layer;
    means for providing a free layer;

means for providing a magnetic nickel nano-contact layer disposed between the means for providing a pinned layer and the means for providing a free layer, the magnetic nickel nano-contact layer having a width equal to a width of the means for providing a pinned layer and the means for providing a free layer; and means for providing a first and second lead layer disposed proximate to the means for providing the pinned layer and free layer respectively, the means for providing a first and second lead layer providing a sense current that flows perpendicular to the planes of the layers.

20. A magnetic storage device, comprising:

means for recording magnetic data thereon;

means for moving the means for recording magnetic data;

means for reading data on the means for recording magnetic data; and means, coupled to the means for reading, for moving the means for reading relative to the means for storing data, the means for reading further comprising:

means for providing a pinned layer;

means for providing a free layer;

means for providing a magnetic nickel nano-contact layer disposed between the means for providing a pinned layer and the means for providing a free layer, the magnetic nickel nano-contact layer having a width equal to a width of the means for providing a pinned layer and the means for providing a free layer; and means for providing a first and second lead layer disposed proximate to the means for providing the pinned layer and free layer respectively, the means for providing a first and second lead layer providing a sense current that flows perpendicular to the planes of the layers.

\* \* \* \* \*

UNITED STATES PATENT AND TRADEMARK OFFICE
CERTIFICATE OF CORRECTION

PATENT NO. : 7,180,714 B2  Page 1 of 1
APPLICATION NO. : 10/674725
DATED : February 20, 2007
INVENTOR(S) : Gill It is certified that error appears in the above-identified patent and that said Letters Patent is hereby corrected as shown below:

On Title Page,

Item (54)
Title of Invention: "Perpendicular-To-Plane" should read -- Perpendicular-In-Plane --

Item (73)
Assignee: "Technolgies" should read -- Technologies --

Item (74)
Attorney, Agent, or Firm: "Daviid" should read --David --

Signed and Sealed this

Eighth Day of May, 2007

JON W. DUDAS
*Director of the United States Patent and Trademark Office*